[19] United States Patent
Kirkwood

[11] 4,240,515
[45] Dec. 23, 1980

[54] VEHICLE HYDRAULIC DRIVE SYSTEM

[76] Inventor: Robert W. Kirkwood, 210 Thorncliff Rd., Kenmore, N.Y. 14223

[21] Appl. No.: 967,776

[22] Filed: Dec. 8, 1978

[51] Int. Cl.³ .................................................. B60K 1/00
[52] U.S. Cl. .................................. 180/165; 180/308; 60/413
[58] Field of Search ............... 180/165, 305, 308, 175, 180/302; 60/413, 414, 417

[56] References Cited
U.S. PATENT DOCUMENTS

| | | | |
|---|---|---|---|
| 2,678,106 | 5/1954 | Vonderheide | 180/305 |
| 3,092,970 | 6/1963 | Sampietro | 180/308 |
| 3,153,900 | 10/1964 | Pigeroulet et al. | 180/305 |
| 3,891,045 | 6/1975 | Pancella | 180/6.3 |
| 3,903,696 | 9/1975 | Carman | 60/414 |
| 3,910,043 | 10/1975 | Clerk | 180/165 |
| 4,132,283 | 1/1979 | McCurry | 180/305 |

FOREIGN PATENT DOCUMENTS 983256  2/1965  United Kingdom ............... 180/165

OTHER PUBLICATIONS

"Measurement of Fluid Flow Rate", *Mechanical Engineers Handbook*, ed. T. Baumeister, 1958, pp. 16-19.

Primary Examiner—Stanley H. Tollberg
Assistant Examiner—Kenneth Noland
Attorney, Agent, or Firm—Lane, Aitken, Ziems, Kice & Kananen

[57] ABSTRACT

A vehicle hydraulic drive system in accordance with the present invention provides an energy efficient system that produces a variable drive "effect" without the use of traction drives or variable displacement hydraulics. The system includes an engine powered hydraulic pump adapted to supply pressurized hydraulic fluid to a hydraulic accumulator and through a propulsion control valve to hydraulic wheel-motor and vehicle speed-control circuits. The valve, when in a forward thrust position, delivers hydraulic fluid in unrestricted flow at full system pressure from the accumulator and the hydraulic pump to the wheel-motors to accelerate the vehicle in the forward direction to a predetermined upper speed-limit, e.g. 55 mph (88.5 kmh). When this upper speed-limit is attained, the speed regulating circuit shifts the propulsion valve to a neutral position to separate the flow of hydraulic fluid to the wheel-motors. The vehicle then "coasts" while the engine continues to drive the hydraulic pump to recharge the accumulator. When the frictional forces on the vehicle cause its speed to drop from the upper limit to a predetermined lower limit, e.g. 54 mph (86.9 kmh), the speed regulating circuit shifts the propulsion valve to the forward thrust position to re-accelerate the vehicle to the upper limit using hydraulic fluid from the accumulator, which was recharged during the "coasting" period, and the hydraulic pump.

48 Claims, 5 Drawing Figures

VEHICLE HYDRAULIC DRIVE SYSTEM

FIELD OF THE INVENTION

The present invention relates to drive systems for vehicles and, more particularly, to an improved hydraulic drive system in which pressurized hydraulic fluid is supplied by an engine driven hydraulic pump to a plurality of wheel-motors to accelerate a vehicle.

PRIOR ART

Various types of vehicle drive system are known for propelling a vehicle. These systems include, for example, thermal engines connected to the vehicle wheels through various types of mechanical transmissions, electrical drive systems, and hydraulic drive systems. The latter type of system typically includes a thermal engine, such as an internal combustion engine, connected to and driving a hydraulic pump which supplies pressurized hydraulic drive fluid to the vehicle wheel-motors through various control valves and fluid conduits. Hydraulic drive systems have evolved into sophisticated and often complex arrangements and have found wide spread use for various classes of vehicles including construction, industrial, and agricultural vehicles. While such systems are generally satisfactory, they are not particularly suited, from an economic standpoint, for use in mass produced passenger-type vehicles because of their high initial cost, their complexity, and their operating inefficiencies. In many hydraulic type drive systems, a combustion engine is normally operated at an idle speed and then accelerated and decelerated in response to the load demand of the hydraulic system. This recurring acceleration and deceleration, as can be appreciated, requires that the engine operate on portions of its power curve where the specific fuel consumption is low and pollutant emissions are unacceptably high. In addition to operating the engine in this matter, many types of hydraulic drive systems achieve speed regulation or control by throttling or restricting the hydraulic fluid flow through various control valve arrangements. While throttling is an effective way to achieve flow control over a wide range, it results in non-recoverable energy losses and requires that the wheel-motors operate at less than their full power rating, and, consequently, on a portion of their power cruve that may not be the most efficient.

SUMMARY OF THE INVENTION

In view of the above described complexity and inefficiencies associated with prior hydraulic drive systems and the current emphasis on high specific fuel consumption and emissions control for engines, it is a broad overall object of the present invention to provide a hydraulic drive system for a vehicle or the like which is simple in design but which achieves good speed control and high overall energy efficiency with minimum engine emissions.

It is another object of the present invention to provide a hydraulic vehicle drive system for a vehicle by which the vehicle is propelled by subjecting it to periods of acceleration alternated with periods of deceleration.

It is a further object of the present invention to provide a hydraulic vehicle drive system for a vehicle by which the vehicle is, in a recurring sequential manner, accelerated to a predetermined upper speed-limit, allowed to "coast" to a predetermined lower speed-limit, and reaccelerated to the upper limit.

It is a further object of the present invention to provide a hydraulic vehicle drive system for a vehicle having hydraulic wheel motors in which the wheel motors are operated at full system pressure during the periods of vehicle acceleration.

It is still a further object of the present invention to provide a hydraulic drive system for a vehicle in which energy looses attributable to fluid flow throttling or fluid flow restriction are minimized by providing fluid flow in an unrestricted manner.

It is a further object of the present invention to provide a hydraulic vehicle drive system for a vehicle having an engine which is operated at a power output level that provides optimum specific fuel consumption while storing engine energy as potential energy for subsequent use during the periods of vehicle acceleration.

It is a further object of the present invention to provide a hydraulic drive system for a vehicle by which kinetic energy from the decelerating vehicle may be recovered and stored as potential energy for subsequent use during the periods of vehicle acceleration.

It is still a further object of the present invention to provide a hydraulic drive system for a vehicle having at least a bi-state speed regulating circuit which achieves a high degree of speed control for the vehicle.

In accordance with the present invention, a hydraulic drive system is provided for a vehicle or the like which includes a thermal engine, such as an internal combustion engine, connected to a hydraulic pump which is adapted to supply pressurized hydraulic fluid to an hydraulic accumulator and through a propulsion control valve to wheel-motor and vehicle speed control circuits. The speed regulating circuit is adjusted to define a preferred upper speed-limit and the control valve, in response to the speed regulating circuit, switches the control valve to the forward thrust position to admit hydraulic fluid in unrestricted flow at full system pressure to the wheel motors. The vehicle is thereby accelerated with hydraulic fluid supplied by the accumulator and the hydraulic pump. When the pre-determined upper speed-limit is achieved, the speed regulating circuit shifts the propulsion control valve to neutral thereby interrupting the flow of hydraulic fluid from the pump and accumulator to the wheel motors. The vehicle then "coasts" and decelerates to a lower speed-limit determined by the speed regulating circuit at which time the propulsion control valve is switched to the forward thrust position to effect re-acceleration of the vehicle to the upper speed-limit. The vehicle is thus propelled by periods of acceleration, during which time hydraulic fluid in unrestricted flow at full system pressure is delivered to the hydraulic motors, alternated by periods of "coasting", during which time the flow of hydraulic fluid to the wheel motors is isolated and the hydraulic accumulator is recharged by the hydraulic pump. Propulsion of the vehicle in accordance with the present invention permits the engine to be continuously operated at optimum specific fuel consumption and/or minimum emissions and also allows the wheel motors to be operated at full system pressure to thereby achieve improved energy efficiency. The vehicle may be declerated by shifting the propulsion control valve to its reverse thrust position whereupon the hydraulic motors function as pumps to supply pressurized hydraulic fluid to the accumulator and thereby recover vehicle kinetic energy as potential energy for subsequent re-use during the periods of acceleration.

BRIEF DESCRIPTION OF THE DRAWINGS

The above description as well as further objects, features, and advantages of the present invention will be more fully understood by reference to the following description of presently preferred but nonetheless illustrative embodiments in accordance with the present invention, when taken in connection with the accompanying drawing, wherein.

DESCRIPTION OF THE PREFERRED EMBODIMENT

Figure 1:
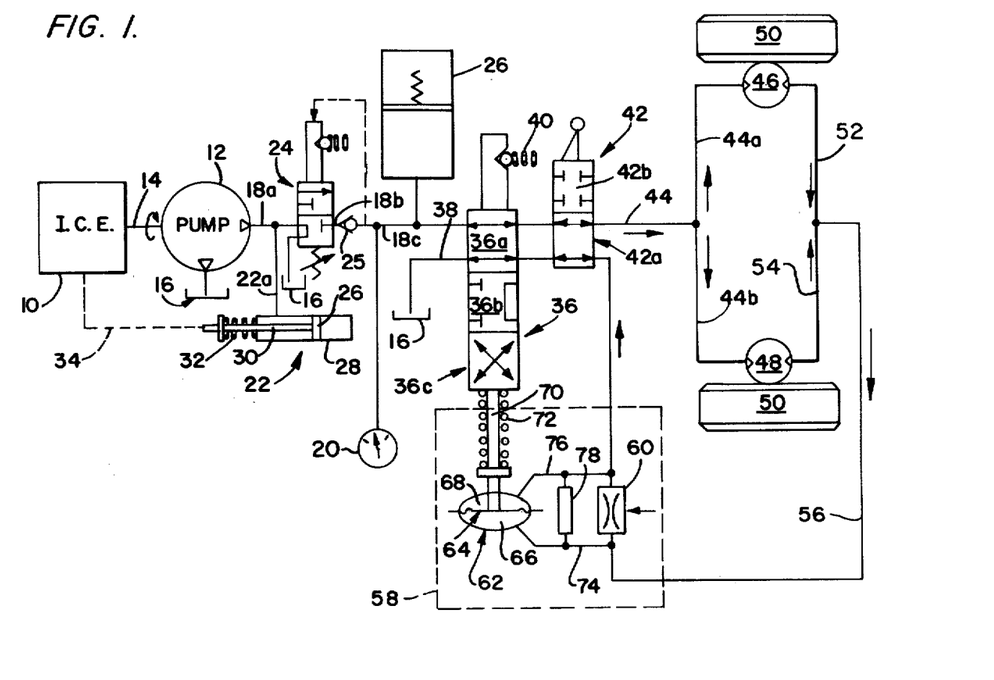
FIG. 1 is a schematic flow diagram of a first embodiment of the present invention showing a propulsion control valve in a forward thrust position.

A hydraulic drive system in accordance with the present invention is illustrated in FIG. 1 and includes an internal combustion engine 10 connected to a hydraulic pump 12 by suitable shafting 14. The pump 12 is adapted to take hydraulic fluid from a sump or reservoir 16 and supply pressurized hydraulic fluid to a fluid supply or delivery conduit 18a which is connected to a throttle control 22 and a pilot-operated, two-position three-way valve 24 that functions to regulate system pressure without fluid restriction and with a near zero pressure drop across the valve 24 by returning fluid to a sump 16 or delivering it under pressure in unrestricted flow to a conduit 18b. The downstream side of the valve 24 is connected through the conduit 18b to a check valve 25 which in turn is connected through a conduit 18c to a fluid pressure indicating meter 20 and a hydraulic accumulator 26. The throttle control 22 includes a piston 26 and cylinder 28 with a piston rod 30 connected to the piston 26 and resiliently urged toward an outwardly extended position by a spring 32. The piston rod 30 is mechanically coupled to the engine throttle by a link represented by the dotted line 34. The chamber defined by the piston rod 30, the cylinder 28, and the piston 26 is designed to be filled with pressurized hydraulic fluid through the conduit 22a causing the piston rod to be displaced to the right in opposition to the force supplied by the spring 32 with the resultant displacement of the piston rod serving to provide a measure of engine throttle control. The throttle control, in combination with the regulation effect of the pressure regulating valve 24, maintains a constant, regulated system pressure, which in the preferred embodiment, may be between 1,000 and 2,500 psi in the delivery conduit 18c and compensates for and accommodates variations in the system pressure between load and no-load conditions. The hydraulic fluid accumulator 26, which is of conventional design (e.g. a spring-loaded, compressed air, or weighted accumulator), is adapted to store a predetermined quantity, e.g. 10 gallons, of hydraulic fluid under pressure for the subsequent re-use on an as required basis.

Figure 1A:
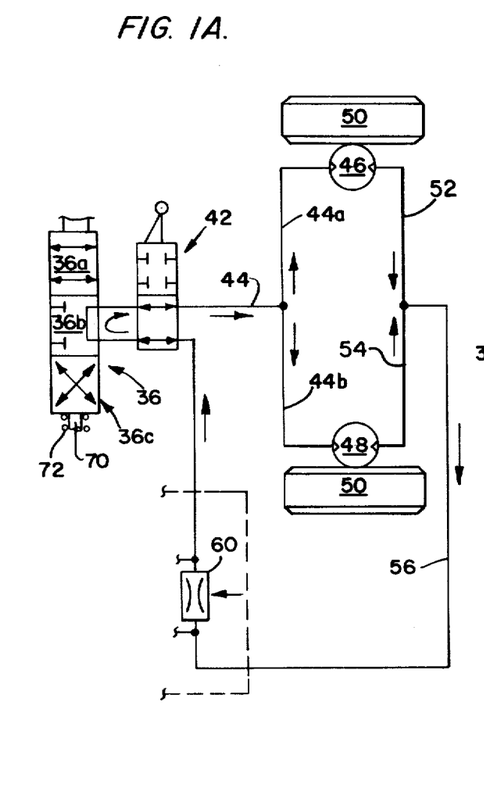
FIG. 1A is a partial schematic diagram, similar to FIG. 1, showing the propulsion control valve in a neutral position.
Figure 1B:
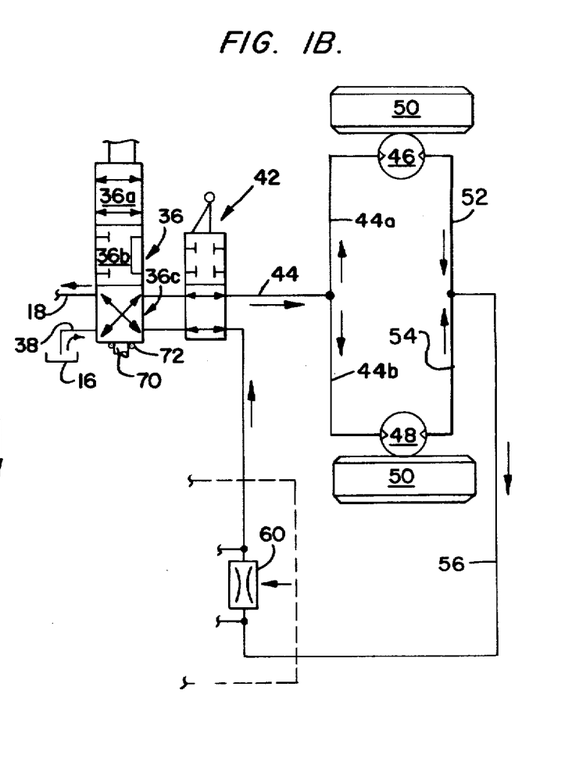
FIG. 1B is a partial schematic diagram, similar to FIGS. 1 and 1A, showing the propulsion control valve in a reserve thrust position.

A three position propulsion control valve 36 is also connected to the delivery conduit 18c and is adapted to permit selective delivery and return of pressurized hydraulic fluid to the vehicle wheel-motors and a speed regulation circuit, both of which are described in more detail below. The valve 36 includes a forward thrust position (FIG. 1) in which a first valve section 36a is positioned in operative registration with the delivery conduit 18c and a return or discharge conduit 38 that leads to the sump 16; a neutral position (FIG. 1A) in which a second valve section 36b is positioned in operative registration with the conduits 18c and 38; and a reverse thrust position (FIG. 1B) in which a third valve section 36c is positioned in operative registration with the conduits 18c and 38. The valve section 36a permits direct flow of the hydraulic fluid in an unrestricted manner at full system pressure and flow rate from the delivery conduit 18c on the left side of the valve to the right side of the valve and the return flow of the discharged hydraulic fluid from the right side to the left side of the valve; the neutral valve section 36b interrupts the flow of hydraulic fluid in the conduits 18c and 38 thereby isolating or separating the fluid on each side of the valve 36 and establishes a shunt flow between the conduits on the right side of the valve 36; and the reverse thrust valve section 36c establishes a cross-flow for the conduits 18c and 38 as shown in FIG. 1B. The valve 36 is also provided with a substantial mechanical hysteresis which may be provided, as schematically shown in FIG. 1, by a spring-loaded ball and detent arrangement. The mechanical hysteresis is such that the valve can be shifted to its various positions only after the shifting force, the source of which is discussed below, attains certain predetermined threshold levels.

The right side of the valve 36 is connected to an "ON-OFF" type valve 42 which, includes an "ON" section 42a that, as shown in FIG. 1, permits the unrestricted delivery of hydraulic fluid at full system pressure and flow rate to the vehicle wheel-motors and the return of the hydraulic fluid to the sump 16 by the valve 36 and the conduit 38, and an "OFF" section 42b that interrupts the fluid flow through the supply and delivery conduits. When the vehicle is stopped, the valve 42 can be placed in its "OFF" position to serve as a vehicle parking brake. The right side of the "ON-OFF" valve 42 is connected to a conduit 44 which, in turn, divides into conduits 44a and 44b. These conduits connect, respectively, to reversible hydraulic wheel-motors 46 and 48 which are adapted to drive ground engaging wheels 50 or the like. The discharge side of each motor 46 and 48 is connected, respectively, through conduits 52 and 54 to a discharge or return conduit 56 which in turn introduces the the return flow of hydraulic fluid to a speed regulation circuit enclosed by the dotted line 58.

The speed regulation circuit includes a variable restriction 60 interposed in the return line 56 and a pressure differential force-actuator 62 which is adapted to control the shift positions of the valve 36. The variable restriction 60 serves as the vehicle speed setting control and may take the form of a variable orifice or a globe-type valve both of which present an adjustable cross-sectional area to the hydraulic fluid in the discharge conduit 56. The force-actuator 62 is formed from two hemispherical halves with a flexible diaphram 64 secured therebetween to define a chamber 66 and another chamber 68. An actuator rod 70 extends from the diaphragm 64 through the wall of one of the hemispheres to the propulsion control valve 36 with a helical coil spring 72 resiliently urging the actuator rod 70 outwardly of the valve towards the force-actuator 62. The upstream, higher pressure side of the variable restriction 60 is connected to the chamber 66 by a conduit 74 and the downstream, lower pressure side of the variable restriction 60 is connected to the chamber 68 by a conduit 76. A pressure differential limiting-device 78 is connected between the conduits 74 and 76 and shunts the variable restriction 60 to limit the pressure differential across the variable restriction 60 to a predetermined maximum, e.g. 20 psi.

In order to use the hydraulic drive system of FIG. 1 to propel a vehicle, the engine 10 is started by a conventional starting means (not shown) to drive the hydraulic pump 12 and cause hydraulic fluid to be taken from the reservoir 16 and supplied under pressure to the delivery conduit 18a. The pressurized fluid fills the hydraulic accumulator 26 to capacity and further actuates the engine throttle control 22 so that the engine runs at a preferred equilibrium speed. This speed is selected to provide a high specific fuel consumption and/or low engine emissions. Control means (not shown) may additionally be provided to return the engine to an idle condition when the accumulator 26 is charged to capacity.

When it is desired to accelerate the vehicle to a selected forward speed, e.g. 55 mph (88.5 kmh), the cross-sectional area of the variable restriction 60 is adjusted to a value which corresponds to the desired upper speed-limit and the valve 42 is manually shifted to the 'ON' position as shown in FIG. 1. Hydraulic fluid from the pump 12 passes through the pressure regulating valve 24, which regulates system pressure without undue fluid throttling by shifting between its two finite positions, through the supply line portion of the propulsion control valve 36, which is normally in its forward thrust position as shown in FIG. 1 because of the urging of the spring 72, through the supply line of the valve section 42a and then to the motors 46 and 48 through the conduits 44, 44a, and 44b. The fluid flow, which is drawn from both the accumulator 26 and the pump 12, causes the motors to rotate the wheels 50 and thereby accelerate the vehicle in the forward direction. The hydraulic fluid discharged from the motors 46 and 48 passes through the conduits 52 and 54, through the return conduit 56, and then through the variable restriction 60. As the hydraulic fluid passes from the upstream side to the downstream side of the restriction 60, a pressure differential is developed across the restriction 60 in accordance with Bernoulli's equation as a function of the cross-sectional area of the restriction and the flow rate of the hydraulic fluid. In the preferred system, a typical pressure differential is in the order of 10–12 PSI which represents, for a system pressure of 2000 PSI, a pressurize differential of approximately 0.5% full system pressure. The energy loss which occurs as the hydraulic fluid flows through the variable restriction 60 is minimal. When the vehicle is initially started from rest, the fluid flow rate through the hydraulic motors 46 and 48 is comparatively small because of the low rotational speed; consequently, the pressure drop across the variable restriction 60 is also comparatively small. As the vehicle accelerates towards its predetermined speed, the fluid flow rate through the hydraulic motors increases, and the pressure differential across the variable restriction 60 likewise increases. The respective pressure between the upstream and downstream side of the variable restriction are communicated to the chambers 66 and 68, respectively, by the conduits 74 and 76. As the pressure differential increases between the upstream and the downstream sides, a mechanical force is developed by the diaphragm 64 as a function of the pressure difference and the area of the diaphragm. This force, which may be upwards of several hundred pounds of force, is communicated to the propulsion control valve 36 by the actuator rod 70. Because of the mechanical hysteresis provided by the detent arrangement 40, described above, the propulsion control valve 36 will not shift its position until a predetermined force level is reached. When this force level is reached, which force corresponds to the selected upper speed-limit for the vehicle, the actuator rod 70 will shift the propulsion control valve 36 from its forward thrust position, as shown in FIG. 1, to its neutral position, as shown in FIG. 1A. The valve section 36b moves into operative registration with the supply and return and blocks or interrupts the flow of hydraulic fluid to the motors and also shunts the delivery and return conduits to one another to establish a wheel-motor recirculation circuit. When the propulsion control valve 36 is shifted to its neutral position, the vehicle is no longer under the influence of the forward thrust forces and the friction forces on the vehicle, such as the drag forces and the mechanical friction, cause the vehicle to gradually decelerate with a consequent reduction in the flow rate around the wheel-motor recirculation loop. As the vehicle decelerates and the fluid flow rate around the wheel motor recirculation loop declines, the pressure differential across the variable restriction 60 declines and the force applied to the propulsion control valve 36 through the rod 70 likewise declines. When the pressure differential drops to a predetermined percentage of the pressure required to initially shift the propulsion control valve 36 from its forward thrust position to its neutral position, the spring 72 shifts the valve 36 back to the forward thrust position, thereby re-accelerating the vehicle to the upper speed-limit as determined by the variable restriction 60. As a practical matter, the variable restriction 60 can be adjusted to provide any one of a number of upper speed-limits and the mechanical hysteresis of the valve, when shifted from its neutral to its forward thrust position, can be designed to cause this shift to take place when the vehicle speed declines to a predetermined percentage, e.g. 96%, of the selected upper speed-limit. For example, the upper speed-limit can be selected at 55 mph (88.5 kmh) and the mechanical hysteresis of the valve 36 can be designed to cause the valve to shift from its neutral to its forward thrust position when the vehicle speed declines to 54 mph (86.9 kmh). In this example, when the vehicle is cruising, it will be sequentially subjected to periods of acceleration where its speed is increased from 54 mph (86.9 kmh) to the upper speed-limit of 55 mph (88.5 kmh) alternated with periods of deceleration during which time the vehicle "coasts" and it speed declines to the lower limit of 54 mph (86.9 kmh).

As can be seen from the above description, the hydraulic drive system of the present invention provides a relatively simple propulsion system which is nonetheless energy efficient. By operating the engine 10 on an efficient portion of its power curve, the fuel consumption per hour is minimized and the engine emissions reduced, and by operating the hydraulic motors 46 and 48 at full system pressure and in unrestricted fluid flow during the periods of acceleration, they operate in their high efficiency regimes. Consequently, the overall energy efficiency of the vehicle drive system of the present invention is increased over those of the prior art systems which control their engine speed and fluid flow rates over wide ranges, and especially over those systems which achieve fluid flow rate control through throttling. The use of the hydraulic accumulator 26 permits substantial amounts of reserve energy to be stored for subsequent re-use during the periods of acceleration and, because the periods of acceleration are generally shorter than the "coasting" periods of deceleration (during which time the engine recharges the accumulator), the engine and pump power rating need not be as large as would be required without the accumulator.

The drive system of the present invention may also be used to provide dynamic or regenerative braking by which kinetic energy from the decelerating vehicle is recovered and stored as potential energy in the accumulator 26. Regenerative braking is effected, when the vehicle is cruising, by further reducing the cross-sectional area of the variable restriction 60. For example, to reduce the speed of a vehicle cruising at, e.g. 55 mph (88.5 kmh) to a lower speed, e.g. 10 mph (16 kmh), the variable restriction 60 is adjusted to present a smaller cross-sectional area to the fluid flow. This causes a larger than usual pressure drop from the upstream to the downstream side of the variable restriction 60 with a consequent increase in the force applied to the propulsion control valve 36 by the forced-actuator 62. In response to this force, the propulsion control valve 36 is shifted from its forward thrust position to its neutral position and then to its reverse thrust position as shown in FIG. 1B. When the valve section 36c is brought into operative registration with the supply and delivery conduits, a cross-flow circulation is established as shown in FIG. 1B with the rotating vehicle wheels 50 causing the wheel-motors 46 and 48 to pump hydraulic fluid in the direction shown. Hydraulic fluid is withdrawn from the reservoir 16 through the line 38, pressurized by the hydraulic motors 46 and 48 and introduced to the delivery line 18c where it recharges the accumulator 26. When the vehicle is operated in the regenerative braking mode, the engine 10 may be returned by suitable control means (not shown) to its idle speed to effect additional fuel savings.

Figure 2:
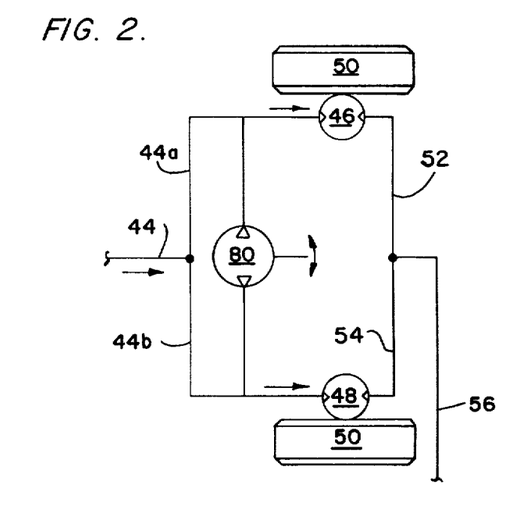
FIG. 2 is a partial schematic diagram showing a variable flow rate steering pump arrangement for providing steering control for the drive system shown in FIG. 1.

The vehicle drive system described above is suitable for use in a four-wheel vehicle having, in addition to the two driven wheels 50, two mechanically steered wheels (not shown) to alter the direction of the vehicle. Steering of the vehicle may also be accomplished by the arrangement shown in FIG. 2 in which a variable-delivery-rate steering pump 80 is connected between the delivery conduits 44a and 44b of the motors 46 and 48. By varying the delivery flow rate between the motors, one wheel may be made to turn slower relative to the other wheel and steering effected.

Figure 3:
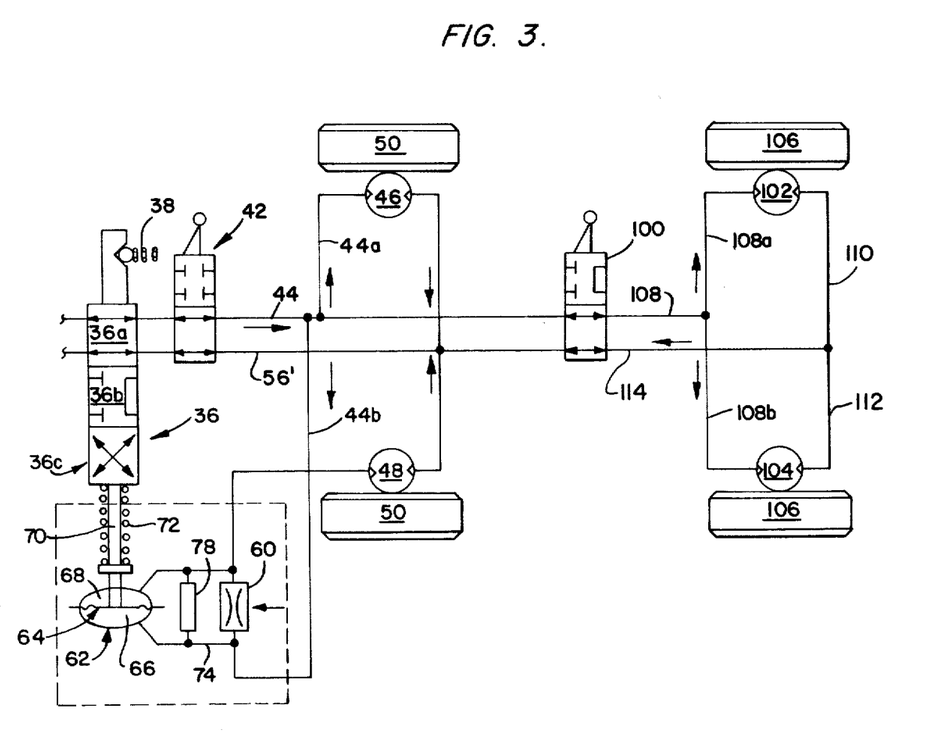
FIG. 3 is a partial schematic diagram of a second embodiment of the present invention.

A more sophisticated form of vehicle hydraulic drive system in accordance with the present invention is shown in FIG. 3, includes the previously described propulsion control valve 36, the speed regulation circuit, and the drive motors 46 and 48; and, in addition, another "ON-OFF" type valve 100, and drive motors 102 and 104 connected to wheels 106. The valve 100 may be manually operated to introduce pressurized hydraulic fluid at full system pressure and in unrestricted flow along the supply conduit 108 and branch conduits 108a and 108b to, respectively, the hydraulic motors 102 and 104. The hydraulic fluid is discharged from the wheel motors through the lines 110 and 112 and returned through the valve 100 via the line 114. In the preferred embodiment, the wheel motors 46 and 48 have a power rating, e.g. 20 hp, which is less than that of the wheel motors 102 and 104, which may be, e.g. 40 hp. The power rating of the wheel-motors 46 and 48 is selected such that these motors provide the vehicle with sufficient thrust to maintain vehicle cruising speed, for example 50 mph, and overcome the drag and frictional forces on the vehicle. The wheel-motors 102 and 104 provide the additional power to increase the vehicle speed upward to a selected upper speed-limit. In practice, when the vehicle has attained its selected cruising speed, the wheel motors 102 and 104 may be disconnected or isolated from the remainder of the drive system by placing the valve 100 in its "OFF" position. Vehicle cruising speed is then maintained by the wheel motors 46 and 48 responding to the speed regulating circuit 58. The pressure regulating valve 24 may then be adjusted to set the accumulator pressure somewhat higher than that required to overcome the drag and frictional forces on the vehicle to greatly increase the thrust/coast cycle time period. The use of a two-position, three-way valve as the pressure regulator 24 permits the system pressure to be efficiently and effectively regulated without the non-recoverable energy losses associated with those types of pressure regulators that achieve system pressure regulation by throttling or otherwise restricting the fluid flow.

As is apparent to those skilled in the art, various changes and modifications may be made to the vehicle hydraulic drive system of the present invention without departing from the spirit and scope of the present invention as recited in the appended claims and their legal equivalent.

What is claimed is:

1. A vehicle drive system comprising:
   a fluid pump means with associated drive means for supplying a flow of pressurized fluid from a fluid sump to a pressurized fluid supply line;
   a pressurized fluid accumulator in fluid communication with said pump means through said pressurized fluid supply line and adapted to receive pressurized fluid therein and discharge pressurized fluid therefrom;
   a pressure regulating valve in fluid communication with said fluid pump means and pilot-operated in response to the pressure of the fluid flow in said supply line to a first state in which the flow of fluid is directed to said accumulator or to a second state in which the fluid flow is directed to a fluid sump;
   a propulsion control valve in fluid communication with said pump means and having finite fluid control states consisting of a fully open position corresponding to a forward thrust position and a fully closed position corresponding to a neutral position;
   at least one fluid motor in fluid communication with said propulsion control valve adapted to receive a flow of fluid through a supply line at full system pressure and flow rate and return said fluid through a return line when said valve is actuated to its fully open position, said fluid motor coupled to a ground-engaging traction-element;
   speed control means responsive to the fluid flow rate through said motor and connected to said propulsion control valve, said speed control means adapted to actuate said propulsion control valve to its fully open position when said fluid flow rate through said motor is below a selected percentage of a predetermined flow rate that corresponds to a predetermined upper speed-limit and adapted to actuate said propulsion control valve to its fully closed position when the fluid flow rate is at or above said predetermined flow rate.

2. The vehicle drive system claimed in claim 1 wherein the speed control means further comprises:
   a variable restriction interposed in the return line of said fluid motor, said restriction causing a pressure differential to be developed from one side thereof to the other side thereof as a function of the flow rate therethrough;
   a force actuator connected to said propulsion control valve and in fluid communication with both sides of said variable restriction and responsive to said pressure differential to actuate said propulsion control valve to and from said open and closed positions.

3. The vehicle drive system claimed in claim 2 further comprises:
   a pressure drop limiting device shunting said variable restriction and adapted to limit the magnitude of any pressure drop to a predetermined maximum.

4. The vehicle drive system claimed in claim 2 wherein said force actuator comprises:
   a housing having a first chamber on one side of a flexible diaphragm and a second chamber on the other side thereof, said first chamber in fluid communication with said one side of said variable restriction and said second chamber in fluid communication with said other side of said variable restriction, said diaphragm displacing and providing a force thereby in proportion to the pressure differential between said first and said second chambers.

5. The vehicle drive system claimed in claim 4 further comprises:
   an actuator rod connected to said diaphragm and said propulsion control valve whereby the force developed by said diaphragm is transmitted to said propulsion control valve to effect actuation thereof to and from said open and closed positions.

6. The vehicle drive system claimed in claim 5 further comprises:
   means for resiliently urging said propulsion control valve to its open position.

7. The vehicle drive system claimed in claim 6 further comprising:
   means for providing said propulsion control valve with an actuation hysteresis such that such propulsion control valve will shift from said fully open position to said fully closed position only when the actuation force reaches a predetermined threshold level and will shift said propulsion control valve from its closed position to its open position when said actuation force declines to a predetermined percentage of said first mentioned threshold level.

8. The vehicle drive system claimed in claim 7 wherein the means for providing the hysteresis is a ball and spring detent device.

9. The vehicle drive system claimed in claim 1 wherein said fluid pump means with associated drive means further comprises:
   a thermal engine connected to a fluid pump;
   an engine throttle control mechanically connected to an engine throttle to maintain said engine speed in response to the pressurized fluid demand.

10. The vehicle drive system claimed in claim 9 wherein said engine throttle control comprises:
    a cylinder having a piston slidably mounted therein defining a chamber between said cylinder and said piston;
    a piston rod secured to said piston and coupled to said engine throttle;
    means establishing fluid communication between said chamber and an output of said fluid pump;
    resilient urging means for resiliently urging said piston in a direction opposite to the direction of the force provided by said pressurized fluid in said chamber.

11. The vehicle drive system claimed in claim 9 wherein:
    said propulsion control valve has, in its open position, a supply line through which fluid is supplied to said motor and a return line through which fluid is returned from said motor, and, in its closed position, means for blocking the flow of supply and return fluid through said valve and for establishing a fluid recirculation circuit through which the fluid flowing through said motor is circulated.

12. The vehicle drive system claimed in claim 11 wherein:
    said fluid motor includes an inlet port in fluid communication with said supply line of said valve and a discharge port in fluid communication with said return line of said valve.

13. The vehicle drive system claimed in claim 1 wherein:
    said propulsion control valve has an additional cross-flow position corresponding to a reversed thrust position, said valve having in its reverse thrust position, a first line which communicates a fluid reservoir with the inlet side of said motor and another line which communicates the discharge of said motor to said pump means and accumulator.

14. The vehicle drive system claimed in claim 1 further comprising:
    at least one additional fluid motor connected in parallel flow with said first mentioned fluid motor and coupled to another ground engaging element.

15. The vehicle drive system claimed in claim 1 further comprising:
    an on-off valve connected between said propulsion control valve and said fluid motor to selectively interrupt the fluid communication therebetween.

16. The vehicle drive system claimed in claim 1 further comprising:
    an on-off valve connected between said propulsion control valve and said second fluid motor pair to selectively interrupt the fluid communication therebetween.

17. A vehicle drive system comprising:
    a fluid pump means with associated drive means for supplying a flow of pressurized fluid from a fluid sump to a pressurized fluid supply line;
    a pressurized fluid accumulator in fluid communication with said pump means through said pressurized fluid supply line and adapted to receive pressurized fluid therein and discharge pressurized fluid therefrom;
    a pressure regulating valve in fluid communication with said fluid pump means and pilot-operated in response to the pressure of the fluid flow in the supply line to a first stage in which the flow of fluid is directed to said accumulator or to a second state in which the fluid flow is directed to a fluid sump;

a propulsion control valve in fluid communication with said pump means and having finite fluid control states consisting of a fully open position corresponding to a forward thrust position and a fully closed position corresponding to a neutral position;

a first fluid motor pair including two parallel connected fluid motors in fluid communication with said propulsion control valve, said fluid motors connected to ground engaging traction elements;

a second fluid motor pair including two parallel connected fluid motors in fluid communication with said propulsion control valve, said fluid motors of said second pair connected to ground engaging elements; and a speed control means responsive to the fluid flow rate through at least one of said wheel-motor pairs and connected to said propulsion control valve, said speed control means adapted to actuate said propulsion control valve to its fully open position when said fluid flow rate through said one of said wheel-motor pairs is below a selected percentage of a predetermined flow rate that corresponds to a predetermined upper speed-limit and adapted to actuate said propulsion control valve to its fully closed position when said fluid flow rate is at or above said predetermined rate.

18. The vehicle drive system claimed in claim 17 wherein:
the horsepower rating of said first fluid motor pair is different from that of said second fluid motor pair.

19. The vehicle drive system claimed in claim 18 wherein:
the horsepower rating of said first fluid motor pair is less than that of said second wheel motor pair;
said first and second wheel-motor pairs having, in combination, sufficient thrust to accelerate said vehicle to a selected cruise speed, and said first wheel-motor pair having, independently of said second wheel-motor pair, sufficient thrust to maintain said vehicle at said selected cruise speed.

20. The vehicle drive system claimed in claim 17 wherein the speed control means further comprises:
a variable restriction interposed in the return line of said second fluid motor pair, said restriction causing a pressure differential to be developed from one side thereof to the other side thereof as a function of the flow rate therethrough;
a force actuator connected to said propulsion control valve and in fluid communication with both sides of said variable restriction and responsive to said pressure differential to actuate said propulsion control valve to and from said open and closed positions.

21. The vehicle drive system claimed in claim 20 further comprises:
a pressure drop limiting device shunting said variable restriction and adapted to limit the magnitude of any pressure drop to a predetermined maximum.

22. The vehicle drive system claimed in claim 20 where said force actuator comprises:
a housing having a first chamber on one side of a flexible diaphragm and a second chamber on the other side thereof, said first chamber in fluid communication with said one side of said variable restriction and said second chamber in fluid communication with said other side of said variable restriction, said diaphragm displacing and providing a force thereby in proportion to the pressure differential between said first and said second chambers.

23. The vehicle drive system claimed in claim 22 further comprises:
an actuator rod connected to said diaphragm and said propulsion control valve whereby the forced developed by said diaphragm is transmitted to said propulsion control valve to effect actuation thereof to and from said open and closed positions.

24. The vehicle drive system claimed in claim 23 further comprises:
means for resiliently urging said propulsion control valve to its open position.

25. The vehicle drive system claimed in claim 24 further comprising:
means for providing said propulsion control valve with an actuation hysteresis such that said propulsion control valve will shift from said fully open position to said fully closed position only when the actuation force reaches a predetermined threshold level and will shift said propulsion control valve from its closed position to its open position when said actuation force declines to a predetermined percentage of said first mentioned threshold level.

26. The vehicle drive system claimed in claim 25 wherein the means for providing the hysteresis is a ball and spring detent device.

27. The vehicle drive system claimed in claim 17 wherein said fluid pump means with associated drive means further comprises:
a thermal engine connected to a fluid pump;
an engine throttle control mechanically connected to an engine throttle to maintain said engine speed in response to the pressurized fluid demand.

28. The vehicle drive system claimed in claim 27 wherein said engine throttle control comprises:
a cylinder having a piston slidably mounted therein defining a chamber between said cylinder and said piston;
a piston secured to said piston and coupled to said engine throttle;
means establishing fluid communication between said chamber and an output of said fluid pump;
resilient urging means for resiliently urging said piston in a direction opposite to the direction of the force provided by said pressurized fluid in said chamber.

29. The vehicle drive system claimed in claim 17 wherein
said propulsion control valve has, in its open position, a supply line through which fluid is supplied to said first and second motor pairs and a return line through which fluid is returned from said first and second motor pairs, and, in its closed position, means for blocking the flow of supply and return fluid through said valve and for establishing a fluid recirculation circuit through which the fluid flowing through said motor pairs is circulated.

30. The vehicle drive system claimed in claim 29 wherein:
said fluid motors each include an inlet port in fluid communication with said supply line of said valve and a discharge port in fluid communication with said return line of said valve.

31. The vehicle drive system claimed in claim 17 wherein:
said propulsion control valve has an additional cross-flow position corresponding to a reversed thrust position, said valve having in its reverse thrust position, a first line which communicates a fluid reservoir with the inlet side of said motor pairs and another line which communicates the discharge of said motor pairs to said pump means and accumulator.

32. A vehicle drive system comprising:
a fluid pump means with associated drive means for supplying a flow of pressurized fluid;
a pressurized fluid accumulator in fluid communication with said pump means and adapted to receive pressurized fluid therein and discharge pressurized fluid therefrom;
a pressure regulating valve connected to the output of said fluid pump means and pilot-operated in response to the pressure of the fluid flow to a first state in which the flow of fluid is directed to said accumulator or to a second state in which the fluid flow is directed to a fluid sump;
a propulsion control valve in fluid communication with said pump means and actuatable to a fully open position corresponding to a forward thrust position or a fully closed position corresponding to a neutral position;
at least one fluid motor in fluid communication with said propulsion control valve adapted to receive a flow of fluid through a supply line at full system pressure and flow rate and return said fluid through a return line when said valve is actuated to said open position, said fluid motor coupled to a ground-engaging traction-element;
speed control means responsive to the fluid flow rate through said motor and connected to said propulsion control valve, said speed control means adapted to actuate said propulsion control valve to said fully open position when said fluid flow rate through said motor is below a selected percentage of a predetermined flow rate that corresponds to a predetermined upper speed-limit and adapted to actuate said propulsion control valve to said fully closed position when the fluid flow rate is at or above said predetermined flow rate;
said speed control means including a variable restriction interposed in the return line of said fluid motor, said restriction causing a pressure differential to be developed from one side thereof to the other side thereof as a function of the flow rate therethrough; and
a force actuator means connected to said propulsion control valve and in fluid communication with both sides of said variable restriction and responsive to said pressure differential to actuate said propulsion control valve to and from said open and closed positions.

33. The vehicle drive system claimed in claim 32 further comprising:
a pressure drop limiting device shunting said variable restriction and adapted to limit the magnitude of any pressure drop to a predetermined maximum.

34. The vehicle drive system claimed in claim 32 wherein said force actuator comprises:
a housing having a first chamber on one side of a flexible diaphragm and a second chamber on the other side thereof, said first chamber in fluid communication with said one side of said variable restriction and said second chamber in fluid communication with said other side of said variable restriction, said diaphragm displacing and providing a force thereby in proportion to the pressure differential between said first and said second chambers.

35. The vehicle drive system claimed in claim 34 further comprising:
an actuator rod connected to said diaphragm and said propulsion control valve whereby the force developed by said diaphragm is transmitted to said propulsion control valve to effect actuation thereof to and from said open and closed positions.

36. The vehicle drive system claimed in claim 35 further comprising:
means for resiliently urging said propulsion control valve to its open position.

37. The vehicle drive system claimed in claim 36 further comprising:
means for providing said propulsion control valve with an actuation hysteresis such that said propulsion control valve will shift from said fully open position to said fully closed position only when the actuation force reaches a predetermined threshold level and will shift said propulsion control valve from its closed position to its open position when said actuation force declines to a predetermined percentage of said first mentioned threshold level.

38. The vehicle drive system claimed in claim 37 wherein the means for providing the hysteresis is a ball and spring detent device.

39. A vehicle drive system comprising:
a fluid pump means with associated drive means for supplying a flow of pressurized fluid;
a pressurized fluid accumulator in fluid communication with said pump means and adapted to receive pressurized fluid therein and discharge pressurized fluid therefrom;
a pressure regulating valve connected to the output of said fluid pump means and pilot-operated in response to the pressure of the fluid flow to a first state in which the flow of fluid is directed to said accumulator or to a second state in which the fluid flow is directed to a fluid sump;
a propulsion control valve in fluid communication with said pump means and actuatable to a fully open position corresponding to a forward thrust position or a fully closed position corresponding to a neutral position;
a first fluid motor pair including two parallel connected fluid motors in fluid communication with said propulsion control valve, said fluid motors connected to ground engaging traction elements;
a second fluid motor pair including two parallel connected fluid motors in fluid communication with said propulsion control valve, said fluid motors of said second pair connected to ground engaging traction elements;
a speed control means responsive to the fluid flow rate through at least one of said wheel-motor pairs and connected to said propulsion control valve, said speed control means adapted to actuate said propulsion control valve to said fully open position when said fluid flow rate through said one of said wheel-motor pairs is below a selected percentage of a predetermined flow rate that corresponds to a predetermined upper speed-limit and adapted to actuate said propulsion control valve to said fully closed position when said fluid flow rate is at or above said predetermined rate;

said speed control means including a variable restriction interposed in the return line of said second fluid motor pair, said restriction causing a pressure differential to be developed from one side thereof to the other side thereof as a function of the flow rate therethrough; and a force actuator means connected to said propulsion control valve and in fluid communication with both sides of said variable restriction and responsive to said pressure differential to actuate said propulsion control valve to and from said open and closed positions.

40. The vehicle drive system claimed in claim 39 wherein:
the horsepower rating of said first fluid motor pair is different from that of said second fluid motor pair.

41. The vehicle drive system claimed in claim 40 wherein:
the horsepower rating of said first fluid motor pair is less than that of said second wheel motor pair;
said first and second wheel-motor pairs having, in combination, sufficient thrust to accelerate said vehicle to a selected cruise speed, and said first wheel-motor pair, sufficient thrust to maintain said vehicle at said selected cruise speed.

42. The vehicle drive system claimed in claim 39 further comprising:
a pressure drop limiting device shunting said variable restriction and adapted to limit the magnitude of any pressure drop thereacross to a predetermined maximum.

43. The vehicle drive system claimed in claim 39 wherein said force actuator means comprises:
a housing having a first chamber on one side of a flexible diaphragm and a second chamber on the other side thereof, said first chamber in fluid communication with said one side of said variable restriction and said second chamber in fluid communication with said other side of said variable restriction said diaphragm displacing and providing a force thereby in proportion to the pressure differential between said first and said second chambers.

44. The vehicle drive system claimed in claim 43 further comprising:
an actuator rod connected to said diaphragm and said propulsion control valve whereby the force developed by said diaphragm is transmitted to said propulsion control valve to effect actuation thereof to and from said open and closed positions.

45. The vehicle drive system claimed in claim 44 further comprising:
means for resiliently urging said propulsion control valve to its open position.

46. The vehicle drive system claimed in claim 43 further comprising:
means for providing said propulsion control valve with an actuation hysteresis such that said propulsion control valve will shift from said fully open position to said fully closed position only when the actuation force reaches a predetermined threshold level and will shift said propulsion control valve from its closed position to its open position when said actuation force declines to a predetermined percentage of said first-mentioned threshold level.

47. The vehicle drive system claimed in claim 46 wherein the means for providing the hysteresis comprises a ball and spring detent device.

48. The vehicle drive system claimed in claim 39 wherein:
said propulsion control valve has, in its open position, a supply line through which fluid is supplied to said first and second motor pairs and a return line through which fluid is returned from said first and second motor pairs, and, in its closed position, means for blocking the flow of supply and return fluid through said valve and for establishing a fluid recirculation circuit through which the fluid flowing through said motor pairs is circulated.

* * * * *